United States Patent
Johnson

(10) Patent No.: US 10,192,192 B2
(45) Date of Patent: Jan. 29, 2019

(54) SECURITY SEAL WITH GLOBAL POSITIONING SYSTEM

(71) Applicant: Brett Allen Johnson, Cedar Rapids, IA (US)

(72) Inventor: Brett Allen Johnson, Cedar Rapids, IA (US)

(*) Notice: Subject to any disclaimer, the term of this patent is extended or adjusted under 35 U.S.C. 154(b) by 0 days.

(21) Appl. No.: 15/806,762

(22) Filed: Nov. 8, 2017

(65) Prior Publication Data

US 2018/0150795 A1   May 31, 2018

Related U.S. Application Data

(60) Provisional application No. 62/427,356, filed on Nov. 29, 2016.

(51) Int. Cl.
*G06Q 10/08* (2012.01)
*G09F 3/03* (2006.01)

(52) U.S. Cl.
CPC ....... *G06Q 10/0833* (2013.01); *G09F 3/0329* (2013.01)

(58) Field of Classification Search
CPC .............. B60G 2202/413; B60G 15/10; B60G 17/016; B60G 2204/11; B60G 2400/0511; B60G 2400/0521; B60G 2400/60; B60G 2800/70; B60G 13/14; B60G 2300/60; B60G 2600/182; B60G 17/019; B60G 17/052
USPC ....... 340/539.1, 568.1, 425.5, 426.1, 426.13, 340/426.16, 426.24, 426.18, 426.19
See application file for complete search history.

(56) References Cited

U.S. PATENT DOCUMENTS

| | | | | |
|---|---|---|---|---|
| 6,249,253 B1* | 6/2001 | Nielsen | ................... | G01S 19/46 342/357.64 |
| 7,275,967 B1* | 10/2007 | Olliff | ..................... | H01R 31/02 439/654 |
| 8,781,442 B1* | 7/2014 | Link, II | ................. | G08G 1/205 455/411 |
| 9,000,917 B1* | 4/2015 | Meyers | ................ | G08B 26/007 340/539.31 |
| 2004/0248462 A1* | 12/2004 | Dyer | ...................... | H01R 29/00 439/502 |
| 2005/0231365 A1 | 10/2005 | Tester et al. | | |
| 2006/0087431 A1 | 4/2006 | Shieh et al. | | |
| 2006/0202824 A1* | 9/2006 | Carroll | ................. | G06Q 10/087 340/568.1 |

(Continued)

*Primary Examiner* — Daniel Previl
(74) *Attorney, Agent, or Firm* — Dunlap Bennett & Ludwig PLLC

(57) ABSTRACT

A container seal. The container seal includes a global positioning system, a transmitter, a processor and a power source. The processor is electrically coupled to the global positioning system and the transmitter. The power source is operable to provide power to the global positioning system, the transmitter and the processor. The present invention further includes a cord coupled to the housing. The cord includes an electrical wiring forming a circuit. The cord further includes a first mating connector that connects to a second mating connector. When the first mating connector and the second mating connector are connected, the circuit is complete and the power source provides power to the global positioning system, the transmitter and the processor.

13 Claims, 4 Drawing Sheets

(56) References Cited

U.S. PATENT DOCUMENTS

2008/0170838 A1* 7/2008 Teetzel .................. A42B 3/042
                                                      386/358

* cited by examiner

SECURITY SEAL WITH GLOBAL POSITIONING SYSTEM

CROSS-REFERENCE TO RELATED APPLICATION

This application claims the benefit of priority of U.S. provisional application No. 62/427,356, filed Nov. 29, 2016, the contents of which are herein incorporated by reference.

BACKGROUND OF THE INVENTION

The present invention relates to tracking shipping containers and, more particularly, to a trailer seal with a positioning system used to track containers.

Security seals are mechanisms used to seal shipping containers. Security seals provide tamper evidence. A broken seal indicates theft or contamination, either accidental or deliberate. Security seals are commonly used to secure semi-truck trailers, vessel containers, chemical drums, airline duty-free trolleys and utility meters.

Currently, to track a shipping container, a carrier must be used. Using freight carriers are expensive. Further, the shipper is at the mercy of the freight carrier to track the shipment and deliver to the recipient. Sometimes carries are unreliable and poorly communicate with the shipper and recipient, causing concern of the whereabouts of the shipping container.

As can be seen, there is a need for an improved system for tracking shipping containers.

SUMMARY OF THE INVENTION

In one aspect of the present invention, a container seal comprises: a housing; a global positioning system coupled to the housing; a transmitter coupled to the housing; a processor coupled to the housing and electrically coupled to the global positioning system and the transmitter; a power source coupled to the housing and configured to provide power to the processor, the global position system and the transmitter; and a cord coupled to the housing and comprising electrically wiring, wherein the cord comprises a first mating connector and a second mating connector, wherein the first mating connector connects to the second mating connector and completes a circuit so that the power source provides power to the global positioning system, the transmitter and the processor, and the processor receives positioning data from the global position system and sends the positioning data to a remote receiver via the transmitter.

In another aspect of the present invention, a system for tracking a container comprises: a container seal comprising: a global positioning system; a transmitter; a processor electrically coupled to the global positioning system and the transmitter; a power source configured to provide power to the processor, the global position system and the transmitter; and a cord comprising electrically wiring, wherein the cord comprises a first mating connector and a second mating connector, wherein the first mating connector connects to the second mating connector and completes a circuit so that the power source provides power to the global positioning system, the transmitter and the processor, and the processor receives positioning data from the global position system and sends the positioning data via the transmitter; and a remote computer comprising a processor, a memory, and a receiver, wherein the remote computer receives the positioning data from the container seal via the receiver and is operable to produce a map on a display comprising a position of the container seal.

In another aspect of the present invention, a method of tracking a container comprises the steps of: providing a container seal comprising: a global positioning system; a transmitter; a processor electrically coupled to the global positioning system and the transmitter; a power source configured to provide power to the processor, the global position system and the transmitter; and a cord comprising electrically wiring, wherein the cord comprises a first mating connector and a second mating connector; wrapping the cord around a latch of the container; and connecting the first mating connector to the second mating connector, and thereby completing a circuit and powering the processor, the global position system and the transmitter, wherein the processor receives positioning data from the global position system and sends the positioning data to a remote receiver via the transmitter.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a seal having a global position system (GPS) and a transmitter operable to transmit coordinates of the seal. Using the present invention, a shipper and/or recipient is able to view the seal via a tracking online website. The present invention eliminates time wasted waiting to acquire an update from the driver, carrier or freight broker for an estimated time of arrival. Using the present invention, the shipper and the recipient can independently monitor the route taken by the transportation provider after the trailer is loaded and has left the facility.

Figure 1:
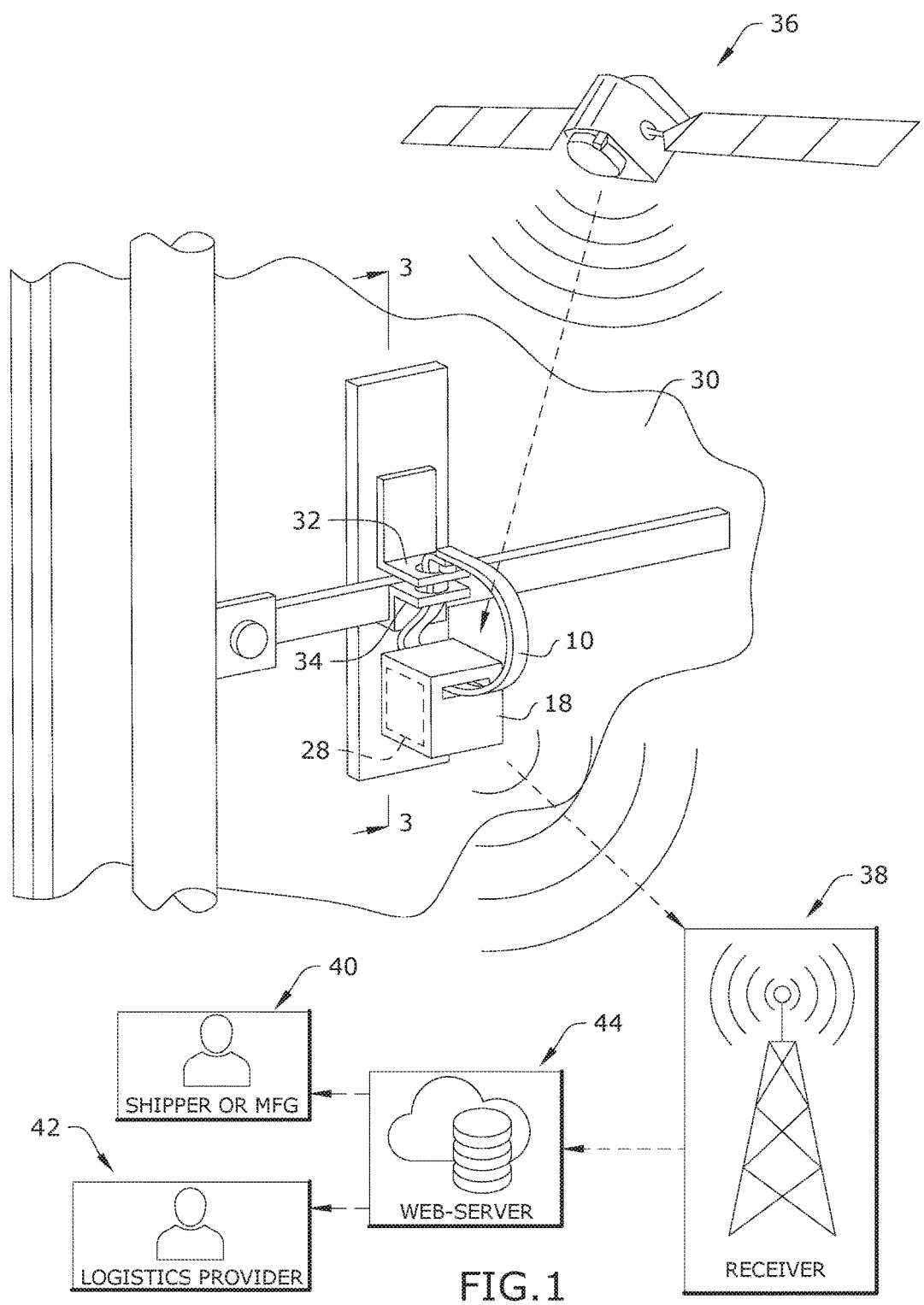
FIG. 1 is a perspective and schematic view of an embodiment of the present invention.
Figure 2:
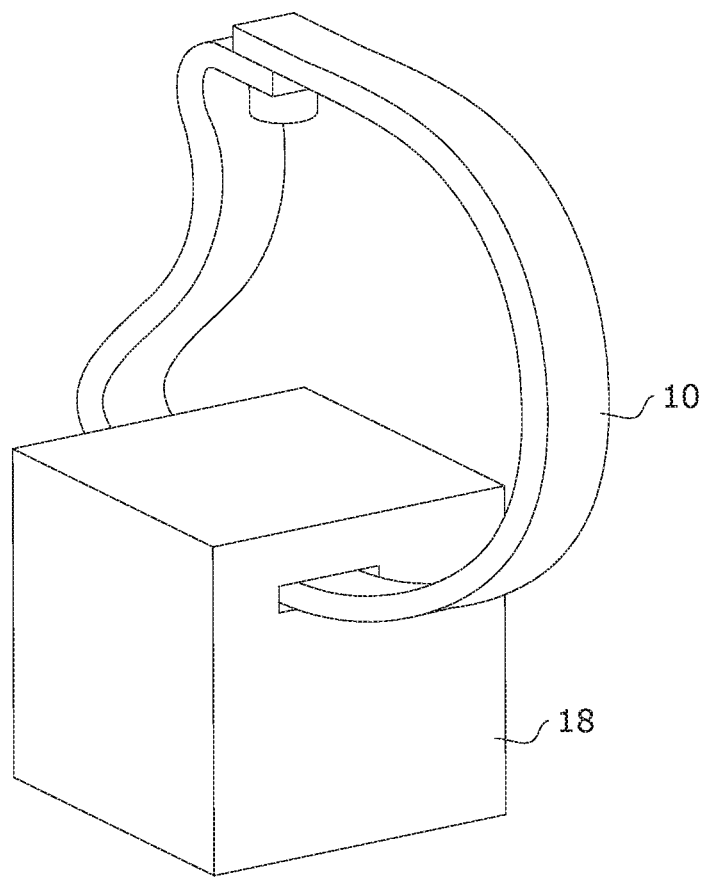
FIG. 2 is a perspective view of an embodiment of the present invention.
Figure 3:
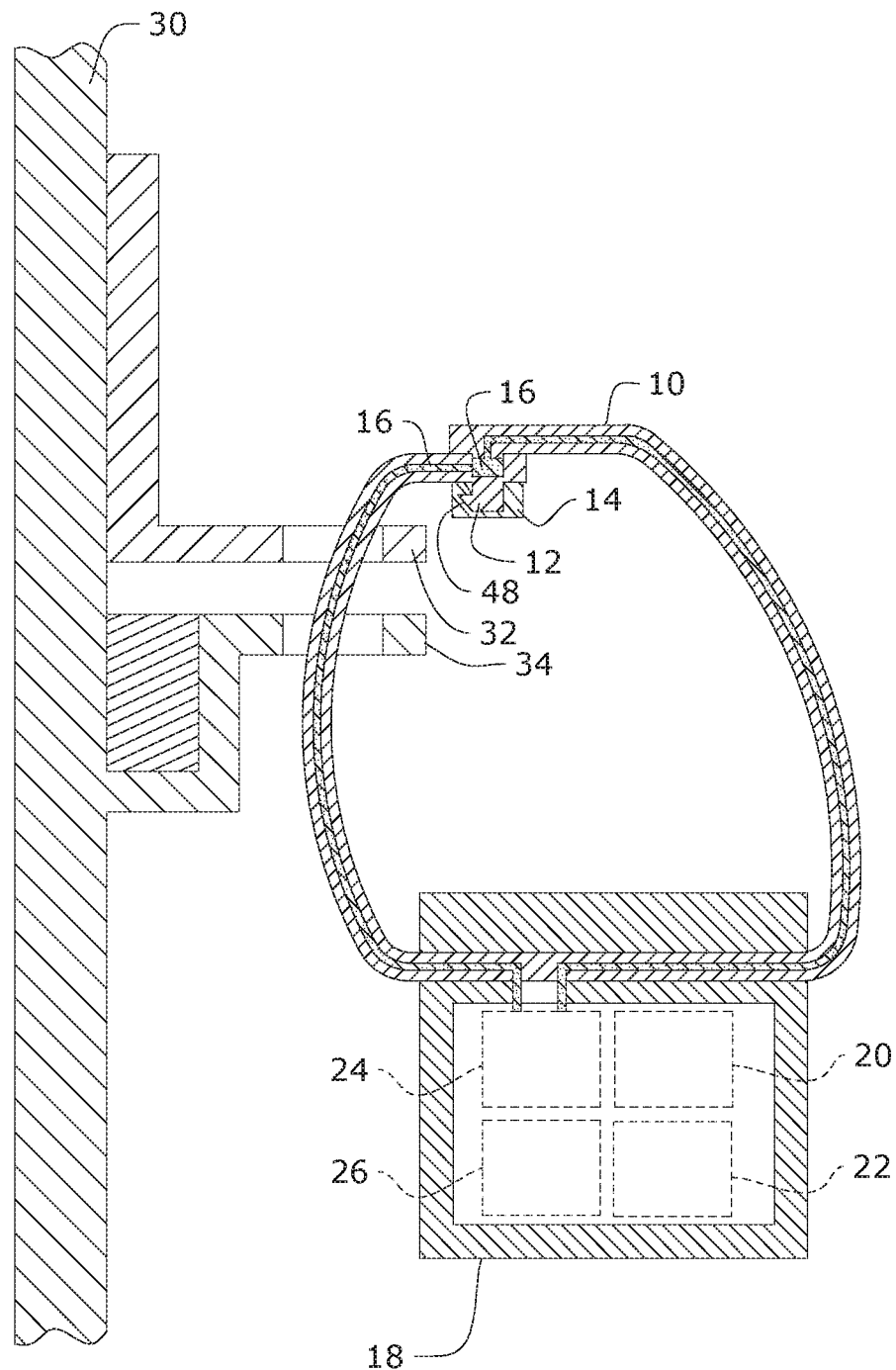
FIG. 3 is a section detail view of the present invention taken along line 3-3 in FIG. 1.
Figure 4:
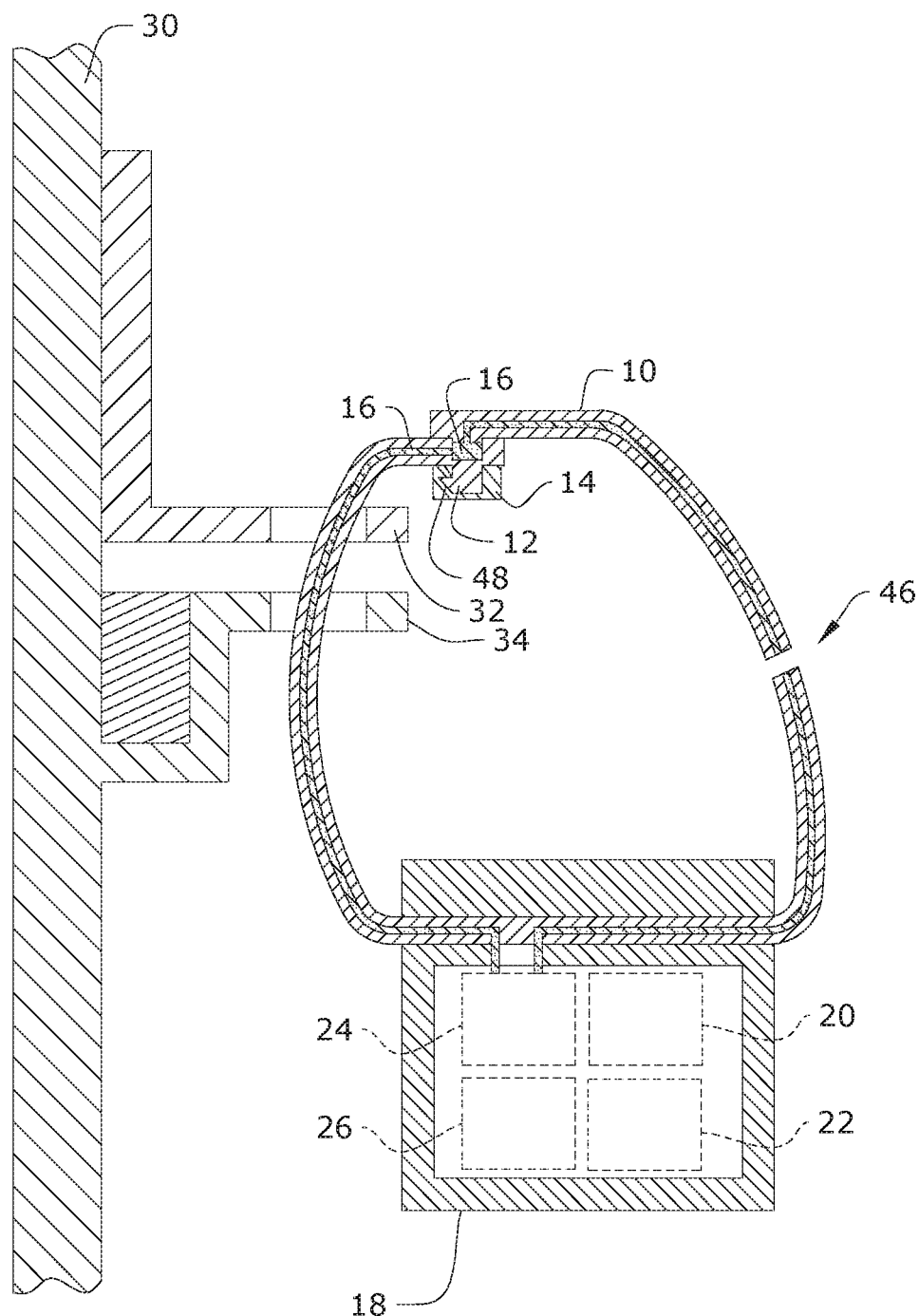
FIG. 4 is a section detail view of an embodiment of the present invention illustrating a broken circuit.

Referring to FIGS. 1 through 4, the present invention includes a container seal. The container seal includes a housing 18. A global positioning system 20, a transmitter 22, a processor 26 and a power source 24 are coupled to the housing 18. The processor 26 is electrically coupled to the global positioning system 20 and the transmitter 22. The power source 24 is operable to provide power to the global positioning system 20, the transmitter 22 and the processor 26. The present invention further includes a cord 10 coupled to the housing 18. The cord 10 includes an electrical wiring 16 forming a circuit. The cord 10 further includes a first mating connector 12 that connects to a second mating connector 14. When the first mating connector 12 and the second mating connector 14 are connected, the circuit is complete and the power source 24 provides power to the global positioning system 20, the transmitter and the processor 26.

The present invention may be used to track a container 30 and further indicate to a user when the container seal has been broken. When the circuit is complete, the global positioning system 20 communicates with a satellite 36 to receive global positioning data. The processor 26 receives the positioning data from the global position system 20 and sends the positioning data to a remote receiver 38 via the transmitter 22. The remote receiver 38 may be part of a web server 44. A shipper 40 or logistics provider 42 may access the web server 44 via a remote computer having a processor and a memory. The remote computer receives the positioning data and produces a map on a display including a position of the container seal. If the cord 10 is broken 46, the circuit is broken and the power source no longer provides power to the processor 26, the transmitter 22 and the global position system 20. The web server 44 may record the global positioning data of when the circuit is broken, providing data of where the container seal is tampered with.

The processors of the container seal, the wireless server 44 and the remote computers include hardware for executing instructions, such as those making up a computer program. The memories includes main memory for storing instructions such as computer program(s) for the processors to execute, or data for processors to operate on.

The web server 44 may further include a database for storing and accessing global positioning data. The database may include a mass storage for data or instructions such as the computer program. As an example and not by way of limitation, the database may include an HDD, a floppy disk drive, flash memory, an optical disc, a magneto-optical disc, magnetic tape, a Universal Serial Bus (USB) drive, a solid-state drive (SSD), or a combination of two or more of these. The database may include removable or non-removable (or fixed) media, where appropriate. The database may be internal or external to the web server 44 where appropriate. In particular embodiments, the database is non-volatile, solid-state memory.

The transmitter 22 may send data to the receiver 38 over a wireless or wired communication. Further, the remote computer may access the web server 44 over a wireless or wired communication. The communications may refer to any interconnecting system capable of transmitting audio, video, signals, data, messages, or any combination of the preceding. Wireless communication may include all or a portion of a public switched telephone network (PSTN), a public or private data network, a local area network (LAN), a metropolitan area network (MAN), a wide area network (WAN), a local, regional, or global communication or computer network such as the Internet, an enterprise intranet, or any other suitable communication link, including combinations thereof.

The communication interfaces, including the transmitter 22, receiver 38 and communications between the web server 44 and remote computers include hardware, software, or both providing one or more interfaces for communication (e.g., packet-based communication) between the container seal, the web server 44 and the remote computers. As an example and not by way of limitation, communication interfaces may include a network interface controller (NIC) or network adapter for communicating with a wireless NIC (WNIC) or wireless adapter for communicating with a wireless network, such as a WI-FI network. This disclosure contemplates any suitable network and any suitable communication interfaces.

The housing 18 may contain and protect the global positioning system 20, the transmitter 22, the processor 26 and the power source 24. An identifying label 28, such as a computer readable code or number, may be printed on an outer surface of the housing 18.

In certain embodiments, the cord 10 includes a first portion extending from a first side of the housing 18 and a second portion extending from an opposing side of the housing 18. The first portion includes the first mating connector 12 and the second portion includes the second mating connector 14. In certain embodiments, the first mating connector 12 is a female clip and the second mating connector 14 is a male clip. The female clip may include a slot and an indent and the male clip may include a shaft and an insert 48. The shaft fits within the slot and the insert snaps 48 into the indent, securing the first portion of the cord 10 to the second portion of the cord 10. Each end of the first portion and the second portion may include ends of the electrical wire 16 (conductors), which connect when the first mating connector 12 connects to the second mating connector 12.

A method of tracking a container 30 may include the following steps. First, provide the container seal described above. Close the container 30 and align a first latch opening of a first latch portion 32 with a second latch opening of a second latch portion 34. Wrap the cord 10 around a latch of the container 30 by inserting one of the first portion of the cord 10 and the second portion of the cord 10 through the aligned openings of the latch portions. Connect the first mating connector 12 to the second mating connector 14, thereby completing the circuit and powering the processor 26, the global position system 20 and the transmitter 22 by the power source 24. The processor 26 then receives positioning data from the global position system 20 and sends the positioning data to the remote receiver 38 via the transmitter 22. The shippers 40 and logistics providers 42 are able to access a web server 44 that continuously publishes the location of the container seal. If the cord 10 of the container seal is broken, the web server 44 is notified and the global positioning data is saved on the web server 44.

It should be understood, of course, that the foregoing relates to exemplary embodiments of the invention and that modifications may be made without departing from the spirit and scope of the invention as set forth in the following claims.

What is claimed is:

1. A container seal comprising:
    a housing;
    a global positioning system coupled to the housing;
    a transmitter coupled to the housing;
    a processor coupled to the housing and electrically coupled to the global positioning system and the transmitter;
    a power source coupled to the housing and configured to provide power to the processor, the global position system and the transmitter; and
    a cord coupled to the housing and comprising electrical wiring, wherein the cord comprises a first portion comprising a proximal end extending from the housing and a terminal distal end comprising a first mating connector and a second portion comprising a proximal end extending from an opposing side of the housing and a terminal distal end comprising a second mating connector, wherein
    the first mating connector connects to the second mating connector and completes a circuit so that the power source provides power to the global positioning system, the transmitter and the processor, and the processor receives positioning data from the global position system and sends the positioning data to a remote receiver via the transmitter.

2. The container seal of claim 1, wherein the first mating connector is a female clip and the second mating connector is a male clip.

3. The container seal of claim 2, wherein the female clip comprises a slot and an indent and the male clip comprises a shaft and an insert, wherein the shaft fits within the slot and the insert snaps into the indent, securing the first portion to the second portion.

4. A system for tracking a container comprising:
a container seal comprising:
 a global positioning system;
 a transmitter;
 a processor electrically coupled to the global positioning system and the transmitter;
 a power source configured to provide power to the processor, the global position system and the transmitter; and
 a cord comprising electrical wiring, wherein the cord comprises a first mating connector and a second mating connector, wherein
 the first mating connector connects to the second mating connector and completes a circuit so that the power source provides power to the global positioning system, the transmitter and the processor, and
 the processor receives positioning data from the global position system and sends the positioning data via the transmitter; and
a remote computer comprising a processor, a memory, a display, and a receiver, wherein the remote computer receives the positioning data from the container seal via the receiver and produces a map on the display comprising a position of the container seal.

5. The system of claim 4, wherein the position data is sent to the remote computer over at least one of the Internet, a wireless network and a telecommunications network.

6. The system of claim 4, wherein the container seal further comprises a housing, wherein the processor, the global positioning system, the transmitter and the power source are disposed within the housing.

7. The system of claim 6, wherein the cord comprises a first portion extending from a first side of the housing and a second portion extending from an opposing side of the housing, wherein the first portion comprises the first mating connector and the second portion comprises the second mating connector.

8. The system of claim 7, wherein the first mating connector is a female clip and the second mating connector is a male clip.

9. The system of claim 8, wherein the female clip comprises a slot and an indent and the male clip comprises a shaft and an insert, wherein the shaft fits within the slot and the insert snaps into the indent, securing the first portion to the second portion.

10. A method of tracking a container comprising the steps of:
providing a container seal comprising:
 a housing;
 a global positioning system coupled to the housing;
 a transmitter coupled to the housing;
 a processor coupled to the housing and electrically coupled to the global positioning system and the transmitter;
 a power source coupled to the housing and configured to provide power to the processor, the global position system and the transmitter;
 a cord coupled to the housing and comprising electrical wiring, wherein the cord comprises a proximal end extending from the housing and a terminal distal end comprising a first mating connector; and
 a second mating connector coupled to the housing,
wrapping the cord around a latch of the container; and
connecting the first mating connector to the second mating connector, and thereby securing the container seal to the latch and completing a circuit and powering the processor, the global position system and the transmitter, wherein
the processor receives positioning data from the global position system and sends the positioning data to a remote receiver via the transmitter.

11. The method of claim 10, wherein the cord comprises a first portion comprising the proximal end extending from a first side of the housing and the terminal distal end comprising the first mating connector and a second portion comprising a proximal end extending from an opposing side of the housing and a terminal distal end comprising the second mating connector.

12. The method of claim 11, wherein the first mating connector is a female clip and the second mating connector is a male clip.

13. The method of claim 12, wherein the female clip comprises a slot and an indent and the male clip comprises a shaft and an insert, wherein the shaft fits within the slot and the insert snaps into the indent, securing the first portion to the second portion.

* * * * *